United States Patent [19]

Buxbaum et al.

[11] 4,145,335

[45] Mar. 20, 1979

[54] THERMOPLASTIC COPOLYESTERS BASED ON POLY-1,4-BUTYLENE TEREPHTHALATE

[75] Inventors: Lothar Buxbaum, Lindenfels, Odenwald, Fed. Rep. of Germany; Jürgen Habermeier, Pfeffingen, Switzerland

[73] Assignee: Ciba-Geigy Corporation, Ardsley, N.Y.

[21] Appl. No.: 892,713

[22] Filed: Apr. 3, 1978

Related U.S. Application Data

[63] Continuation-in-part of Ser. No. 742,307, Nov. 16, 1976, abandoned.

[30] Foreign Application Priority Data

Nov. 26, 1975 [CH] Switzerland .............................. 15307

[51] Int. Cl.$^2$ ............................................. C08G 63/18

[52] U.S. Cl. ..................................................... 528/302
[58] Field of Search ...................................... 260/75 R

[56] References Cited

U.S. PATENT DOCUMENTS

| | | | |
|---|---|---|---|
| 3,436,301 | 4/1969 | McHale | 260/75 R X |
| 3,682,863 | 8/1972 | McHale | 260/75 R |
| 3,864,314 | 2/1975 | Modler et al. | 260/75 R |

*Primary Examiner*—Lucille M. Phynes
*Attorney, Agent, or Firm*—Luther A. R. Hall

[57] ABSTRACT

Copolyesters which are based in poly-1,4-butylene therephthalate and contain 2,5–15 mol %, relative to the polyester, of branched aliphatic dicarboxylic acids with 7–30 C-atoms are outstandingly suitable for the manufacture of mouldings having improved toughness properties.

9 Claims, No Drawings

THERMOPLASTIC COPOLYESTERS BASED ON POLY-1,4-BUTYLENE TEREPHTHALATE

This is a continuation-in-part application of application Ser. No. 742,307, filed Nov. 16, 1976, now abandoned.

The present invention relates to copolyesters which are based on poly-1,4-butylene terephthalate and contain co-condensed branched aliphatic dicarboxylic acids.

Recently, reinforced and unreinforced poly-1,4-butylene terephthalate has gained importance as a high-grade material. This thermoplastic moulding composition is one of the so-called engineering plastics, that is to say those materials from which mouldings with high mechanical strength properties can be manufactured by means of suitable moulding processes, for example injection moulding or extrusion. These moulding compositions are also distinguished by advantageous processing properties.

In spite of this advantageous spectrum of properties, this material cannot satisfy the demands made in all the fields of application. Thus, it has not been possible hitherto to replace other materials, such as, for example, the polyamides, which are known for the same intended application but possess certain disadvantages. Inter alia, the absorption of moisture, and the dependence, associated therewith, of mechanical properties on the environmental conditions, is a disadvantage when using polyamides. It is thus desirable to modify poly-1,4-butylene terephthalate in such a way that it can fulfil the demands made in various fields of application where, for example, a higher flexibility and a higher toughness of the material is required.

In addition to pure poly-1,4-butylene terephthalate, copolyesters with other diols and dicarboxylic acids have also been disclosed. In German Offenlegungsschrift No. 2,051,232, poly-1,4-butylene terephthalates of higher molecular weight and copolyesters thereof with aliphatic dicarboxylic acids are proposed for the manufacture of moulded articles. The only branched dicarboxylic acid mentioned here is dimethylmalonic acid. German Offenlegungsschrift No. 2,049,538 describes crystalline sheets of poly-1,4-butylene terephthalate and copolyesters thereof with aliphatic dicarboxylic acids, such as adipic acid, azelaic acid and dimethylmalonic acid. A process for the manufacture of copolyesters of polyalkylene terephthalates is described in German Offenlegungsschrift No. 2,336,026, the co-components mentioned being some linear aliphatic dicarboxylic acids, such as, for example, glutaric acid and sebacic acid. Finally, German Offenlegungsschrift No. 2,340,959 discloses adhesive compositions from a vinyl-aromatic polymer and a copolyester of poly-1,4-butylene terephthalate and dimer acid (dicarboxylic acids obtained by dimerisation of unsaturated fatty acids). These copolyesters can also contain other aliphatic dicarboxylic acids, such as, for example, maleic acid, dimethylmalonic acid, adipic acid or 2-methyladipic acid.

British Pat. No. 1,246,924 discloses dyeable copolyester fibers made from polyethylene terephthalate with from 0.5 to 15 mol% of branched substituted succinic acid components.

British Pat. No. 1,115,340 pertains to new copolyester adhesives containing four components namely tetramethylene glycol with terephthalic acid, isophthalic acid and a single acyclic dicarboxylic acid of 6 to 12 carbon atoms in a linear chain with the aromatic acids being in the range of 70 to 85 mol percent of the acid component and the acyclic acid being in the 30 to 15 mol% range.

British Pat. No. 869,959 pertains to dyeable polyester fibers prepared from a glycol of 2 to 10 carbon atoms, exemplifying only ethylene glycol, and from aromatic diacids comprising terephthalic or a mixture of terephthalic and isophthalic acid components with at least one branched saturated aliphatic dicarboxylic acid of 20 carbon atoms.

British Pat. No. 904,446 discloses copolyesters of aromatic dicarboxylic acids, polymethylene glycols of 2 to 10 carbon atoms with up to 30 percent by weight of the diacid component being an aliphatic dicarboxylic acid of 4 to 20 carbon atoms.

British Pat. No. 1,114,564 relates to thermoplastic copolyester adhesives comprising inter alia copolyesters made from glycols with 2 to 6 carbon atoms and 15-70 mol percent of the acid component being cyclobutane-1,2-dicarboxylic acid and 85-30 mol percent of terephthalic acid. Up to 30 mol percent of the acid component may be inter alia an aliphatic dicarboxylic acid of 4 to 12 carbon atoms.

British Pat. No. 1,327,593 pertains to melt adhesives from copolyesters made from terephthalic acid (with up to 50 mol% of which may be isophthalic acid), a straight or branched aliphatic dicarboxylic acid with 6 to 12 carbon atoms and a glycol of 2 to 10 carbon atoms.

The copolyesters of the prior art although related in structure to the instant copolyesters are used as chiefly as melt adhesives and in dyeable fibers. The utility of the instant copolyesters as outstanding molding compounds is the object of the present invention.

The instant copolyesters based on poly-1,4-butylene terephthalate (PBT) exhibit, compared to pure PBT, increased flexibility and notched impact strenght, without the advantageous processing properties being unduly impaired thereby.

The present invention relates to molded articles prepared by molding a linear thermoplastic copolyester from terephthalic acid, 1,4-butanediol and a saturated aliphatic dicarboxylic acid, which have a relative viscosity of at least 1.6, measured at 30° in a 1% strength solution of equal parts of phenol and symmetrical tetrachloroethane, wherein, as the aliphatic dicarboxylic acid, 2.5–15 mol %, relative to the polyester, of one or more branched dicarboxylic acids with 7 to 30 carbon atoms per molecule are co-condensed in the polyester in statistical distribution.

A further object of this invention is a process of improving toughness properties of polybutylene-1,4-terephthalates the process being characterized by incorporating 2,5–15 mol% of one or more branched dicarboxylic acids with 7 to 30 carbon atoms in the molecule by co-condensation in statistical distribution.

Preferably, 3 to 10, especially 4 to 7.5, mol % of dicarboxylic acid are co-condensed, the relative viscosity is preferably 1.6 to 3.5, the branched dicarboxylic acid preferably contains 8 to 22 carbon atoms and the branched dicarboxylic acid preferably contains branched alkylene groups.

The branched dicarboxylic acid can have one or several branches and the alkyl of the side chain can preferably contain 1 to 18 carbon atoms. Both long-chain dicarboxylic acids with short side chains, for example methyl, and short-chain dicarboxylic acids with longer side chains, for example ethyl to eicosyl, are suitable. The short-chain dicarboxylic acids preferably contain 1 to 4 carbon atoms in the alkylene and 4 to 18 carbon atoms in the alkyl. The shorter the alkylene, the longer preferably is the alkyl.

Examples of suitable dicarboxylic acids are: n-butylmalonic acid, decylmalonic acid, n-propylglutaric acid, 2,3-diethylglutaric acid, 2-methyladipic acid, 2,2,4-trimethyladipic acid, octadecylglutaric acid, 1,3-dodecanedicarboxylic acid, 1,6-tetradecanedicarboxylic acid, 1,8- or 1,9-heptadecanedicarboxylic acid, 1,12-pentadecanedicarboxylic acid, 1,17-octadecanedicarboxylic acid and 1,12-eicosanedicarboxylic acid.

The copolyesters according to the invention are manufactured, by means of known processes, by a polycondensation reaction of terephthalic acid, an aliphatic branched dicarboxylic acid with 7 to 30 carbon atoms or polyester-forming derivatives thereof, with 1,4-butanediol.

Examples of the known processes for the manufacture of the new polyesters are solution condensation, azeotropic condensation, interface condensation, melt condensation or solid phase condensation and also combinations of these methods, depending on which polyester-forming derivatives and which reaction catalysts are used. The polyester-forming derivatives of terephthalic acid and of the aliphatic branched dicarboxylic acids are in the main the low-molecular dialkyl esters with 1 to 4 carbon atoms in the molecule, preferably dimethyl esters or diphenyl esters. Moreover, the acid dihalides, in particular the acid dichlorides, and the anhydrides are also suitable.

The new polyesters can be manufactured by esterifying, or transesterifying, terephthalic acid and branched aliphatic dicarboxylic acids, or low-molecular dialkyl esters thereof, with 1,4-butanediol in an inert atmosphere, for example a nitrogen atmosphere, in the presence of catalysts and with simultaneous removal of the resulting water or alkanol respectively, at 150°–250° C. and subsequently carrying out the polycondensation at 200° to 270° C. and under reduced pressure in the presence of certain catalysts, until the polycondensed products have the desired viscosity.

Amines, inorganic or organic acids, for example hydrochloric acid or p-toluenesulphonic acid, or metals or metal compounds, which are also suitable as the transesterification catalyst, can be used in a known manner as the esterification catalysts.

Since some catalysts preferentially accelerate the transesterification and other catalysts preferentially accelerate the polycondensation, it is advantageous to use a combination of several catalysts. Examples of suitable transesterification catalysts are the oxides, salts or organic compounds of the metals calcium, magnesium, zinc, cadmium, manganese, titanium and cobalt. The metals as such can also be used as catalysts. For example, the polycondensation is catalysed by metals such as lead, titanium, germanium, tin and, in particular, antimony, or by compounds thereof. These catalysts can be added to the reaction mixture together or separately. These catalysts are employed in amounts of about 0.001 to 1.0 percent by weight, relative to the acid component.

In the manufacture of the new polyesters, catalysts which are used with particular advantage are those which accelerate both the transesterification and the polycondensation. Possible catalysts of this type are above all mixtures of different metals or metal compounds and also corresponding metal alloys.

The polycondensation reaction is continued until the polyesters have a relative viscosity of at least 1.6, preferably 1.6 to 3.5. Depending on the type of catalyst used and on the size of the batch, the reaction times amount to about 30 minutes up to several hours. After the resulting polyester melt has been removed from the reaction vessel and cooled, it is granulated, or cut into chips, in the customary manner.

In another process for the manufacture of the new polyesters, dicarboxylic acid dihalides, preferably the acid dichlorides, are subjected to a polycondensation with 1,4-butanediol in the presence of a basic catalyst in the temperature range from 0° to 100° C., hydrogen halide being eliminated. The basic catalysts used are preferably amines or quaternary ammonium salts. The proportion of basic catalyst can be from 0.1 to 100 mol %, relative to the acid halides. It is also possible to carry out this process without a solvent or in the presence of a solvent.

The polycondensation can also be carried out in such a way that the starting compounds are first subjected to a condensation in the melt up to a certain viscosity, the precondensate prepared in this way is then granulated, for example with the aid of an underwater granulator, and the granules are dried and then subjected to a solid phase condensation, a vacuum being applied and a temperature below the melting point of the granules being employed. Higher viscosities can be achieved in this way.

Inert additives of any type, such as, for example, reinforcing fillers, especially 5 to 50% by weight of sized glass fibres, inorganic or organic pigments, optical brighteners, delustering agents, agents which promote crystallisation, mould release agents or flame-retardant agents, can be added to the reaction composition when the polyester melt is being worked up or even before the polycondensation reaction, or after the reaction in the molten phase has ended.

If the polycondensation reaction is carried out discontinuously, the inert additives can be added already during the last stages of the condensation, for example in the solid phase condensation or at the end of the melt condensation.

The copolyesters according to the invention are crystalline and, surprisingly, crystallise somewhat more readily than, for example, copolyesters with linear dicarboxylic acids, such as, for example, adipic acid. This behaviour is unexpected since it has been assumed hitherto that the introduction of branched radicals into the polyester chain more extensively disturbs the symmetry and hence impairs the crystallisability to a greater extent. The somewhat improved crystallisability manifests itself in shorter cycle times, for example particularly in mass production.

Furthermore, the molded articles made from the copolyesters according to the invention have a higher flexibility than those from pure linear PBT, the flexibility being approximately similar to that of polyamide 11 or polyamide 12, and also have better toughness properties, better arc resistance and a lower after-shrinkage. It has been found here, surprisingly, that the notched impact strength is increased by aliphatic branched dicarboxylic acids having a minimum carbon number of about 7, starting from a minimum addition of about 2.5 mol %.

The copolyesters are valuable thermoplastic materials from which mouldings of various types can be manufactured by the customary moulding processes, such as casting, injection moulding or extrusion. Examples of these mouldings are fuel lines or compressed air lines, conductor sheathing, components of technical apparatus, profiles or electrical insulations. They can also be used as a sintered powder for surface-coatings and for the manufacture of films, sheets and fibres.

Those copolyesters according to the invention which contain 3 to 10, in particular 4–7.5, mol % of branched dicarboxylic acids are preferentially employed for processing by injection moulding and extrusion. Copolyesters which contain more than 7.5 up to 15 mol % are also suitable for use as hot-melt adhesives or as bonding fibres or fusible fibres for the manufacture of spun-bonded nonwovens.

The polyesters prepared in accordance with the examples which follow are characterised in more detail by the following characteristic data.

The polyesters are characterised by those morphological changes which are measured, by means of differential thermal analysis, on a sample which has been heat-treated for 3 minutes at a temperature 30° C. above the melting point or softening point and then rapidly chilled. The chilled sample is heated, at a heating rate of 16° C./Minute, by means of the "DSC-1B" Differential Scanning Calorimeter from Messrs. Perkin-Elmer. The thermogram of the sample shows the glass transition temperature ($T_g$) and the melting point ($T_m$). The point of inflection at the discontinuous increase of the specific heat in the thermogram is quoted as the glass transition temperature and the tip of the endothermic peak is quoted as the melting point. The relative viscosity of the polycondensed products is measured, at 30° C., on solutions of 1 g of polyester in 100 ml of a mixture consisting of equal parts of phenol and symmetrical tetrachloroethane.

The crystallisation temperature ($T_c$) is determined, after the sample has been heated up, by allowing the sample to cool at the same rate. The tip of the exothermic peak in the thermogram, which is obtained in accordance with the differential thermal analysis indicated above, is designated as the crystallisation temperature. In contrast to customary methods, the $T_c$ is here determined from above since it is not possible, because of the ready crystallisation of the polyesters, to prepare supercooled melts, that is to say amorphous products.

The methods of determining the mechanical properties are indicated in the examples.

EXAMPLE 1

3,492 g (45 mol %) of dimethyl terephthalate (DMT), 3,605 g of butane-1,4-diol (50 mol %), 376 g (5 mol %) of dimethyl 2,2,4-trimethyladipate and 2.29 g of isopropyl titanate are filled into a 10 liter reactor equipped with a stirrer, nitrogen inlet, condenser and temperature measurement. Whilst stirring and passing nitrogen through the reactor, 97% of the amount of methanol which is theoretically to be expected are distilled off in the course of 1 hour and 35 minutes, the temperature of the reaction mixture rising to 214° C. After the reaction mixture has been heated to 240° C., a vacuum of 60 mm Hg is applied in the course of half an hour by means of a water pump and, at the same time, the reaction temperature is raised to 250° C. The vacuum is increased to 0.90 mm Hg in the course of 50 minutes by means of a vacuum pump, the reaction temperature remaining the same, and the mixture is left under this vacuum for 210 minutes. The melt is then discharged and granulated.

The characteristic data of the polyester are indicated in Table 1. The polyester is injection-moulded to give standard small bars and the mechanical properties indicated in Table 1 are determined on these bars.

EXAMPLES 2–7

The procedure followed is as in Example 1. After the reaction temperature has been reached, the vacuum is increased to 0.45 mm Hg in the course of 40 minutes and the mixture is left under this vacuum for 125 minutes. Co-components and the characteristic data of the polyesters obtained are indicated in Table 1.

For comparison, the properties of PBT are also indicated in Table 1.

PBT has a $T_c$ of 177° C. and a copolyester with 5 mol % of dimethylmalonic acid has the same $T_c$. Copolyesters with 5 mol % of adipic acid or 5 mol % of azelaic acid have a $T_c$ of as low as 152° C. or 151° C. respectively. By comparison with Example No. 1, this shows the better crystallisability of the copolyesters according to the invention as compared with those containing linear co-components.

| Example No. | Component (relative to polyester) | η rel. | $T_c$ [° C] | $T_m$ [° C] | Flexural strength (ASTM D 790) | Modulus of elasticity from bending test | Impact strength (DIN 53,453) | Notched impact strength (DIN 53,453) |
|---|---|---|---|---|---|---|---|---|
| 1 | 5 mol % of 2,2,4-trimethyl-adipic acid | 2.36 | 158 | 203 | 490 | 14,000 | No fracture | 9 |
| 2 | 2.5 mol % of octadecylsuccinic acid | 2.20 | 156 | 205 | 308 | 4,894 | No fracture | 10 |
| 3 | 5 mol % of heptadecanedicarboxylic acid* | 2.36 | 157 | 205 | 312 | 4,120 | No fracture | No fracture |
| 4 | 5 mol % of tert.-butyl-adipic acid | 1.86 | 164 | 207 | — | — | — | — |
| 5 | 7 mol % of 2,2,4-tri-methyladipic acid | 2.31 | 144 | 201 | — | — | — | — |
| 6 | 3.75 mol % of 2,2,4-tri-methyladipic acid | 2.16 | 166 | 218 | — | — | — | — |
| 7 | 14 mol % of 2,2,4-tri-methyladipic acid | 2.25 | 108 | 174 | — | — | — | — |

-continued

| Example No. | Component (relative to polyester) | η rel. | $T_c$ [°C] | $T_m$ [°C] | Flexural strength (ASTM D 790) | Modulus of elasticity from bending test | Impact strength (DIN 53,453) | Notched impact strength (DIN 53,453) |
|---|---|---|---|---|---|---|---|---|
| PBT (comparison) | — | 2.30 | 177 | 228 | 850 | 27,000 | No fracture | 5 |

*Mixture of the 1,8- and 1,9-isomers (manufacturer BASF)

What is claimed is:

1. A molded article prepared by molding a linear thermoplastic copolyester from terephthalic acid, 1,4-butanediol and a saturated aliphatic dicarboxylic acid, having a relative viscosity of at least 1.6, measured at 30° C. on a 1% strength solution in equal parts of phenol and symmetrical tetrachloroethane, wherein, as the aliphatic dicarboxylic acid, 2.5–15 mol%, relative to the polyester, of one or more branched dicarboxylic acids with 7 to 30 carbon atoms per molecule are co-condensed in the polyester in statistical distribution.

2. An article according to claim 1 wherein 3–10 mol% of dicarboxylic acid is cocondensed in the copolyester.

3. An article according to claim 2 wherein 4–7.5 mol% of dicarboxylic acid is cocondensed.

4. An article according to claim 1 wherein the branched dicarboxylic acid contains 8 to 22 carbon atoms.

5. An article according to claim 1 wherein the side chains of the cocondensed branched dicarboxylic acids contain alkyl groups with 1 to 18 carbon atoms.

6. An article according to claim 1 wherein the cocondensed dicarboxylic acid has several branches.

7. An article according to claim 1 wherein 2,2,4-trimethyladipic acid, octadecylsuccinic acid, tert-butyladipic acid or a mixture of the 1,8- and 1,9-isomers of heptadecanedicarboxylic acid is cocondensed.

8. An article according to claim 1 which contains 3–5 mol% of heptadecanedicarboxylic acid or 5–8 mol% of 2,2,4-trimethyladipic acid.

9. A process of improving toughness properties of poly-1,4-butyleneterephthalate which comprises incorporation of 2,5–15 mol-% of one or more branched aliphatic dicarboxylic acids as defined in claim 1 in statistical distribution by co-condensation.

* * * * *